(12) United States Patent
Yamanaka et al.

(10) Patent No.: US 10,110,009 B2
(45) Date of Patent: Oct. 23, 2018

(54) SWITCH COVER FOR POWER CONVERTER AND POWER CONVERSION SYSTEM

(71) Applicant: KABUSHIKI KAISHA YASKAWA DENKI, Kitakyushu-shi (JP)

(72) Inventors: Yasunori Yamanaka, Kitakyushu (JP); Masafumi Sakai, Kitakyushu (JP); Kenshiro Morishita, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 523 days.

(21) Appl. No.: 14/811,943

(22) Filed: Jul. 29, 2015

(65) Prior Publication Data

US 2016/0037668 A1 Feb. 4, 2016

(30) Foreign Application Priority Data

Jul. 29, 2014 (JP) .................................. 2014-154146

(51) Int. Cl.
*H05K 5/03* (2006.01)
*H02M 7/44* (2006.01)
(Continued)

(52) U.S. Cl.
CPC ............... *H02J 3/383* (2013.01); *H02M 1/32* (2013.01); *H02M 7/44* (2013.01); *Y02E 10/563* (2013.01)

(58) Field of Classification Search
CPC ......... H02J 3/383; Y02E 10/563; H02M 1/32; H02M 7/44
See application file for complete search history.

(56) References Cited

U.S. PATENT DOCUMENTS

2010/0296246 A1* 11/2010 Kishimoto ......... H05K 7/20172
361/695
2014/0078793 A1* 3/2014 Sivakumar ............. H02H 7/122
363/55

FOREIGN PATENT DOCUMENTS

CN 101892999 A 11/2010
CN 203562963 U 4/2014
(Continued)

OTHER PUBLICATIONS

Office Action dated Sep. 13, 2016, in Japanese Patent Application No. 2014-154146, filed Jul. 29, 2014 (with English-language Translation).
(Continued)

*Primary Examiner* — Jared Fureman
*Assistant Examiner* — Michael Warmflash
(74) *Attorney, Agent, or Firm* — Oblon, McClelland, Maier & Neustadt, L.L.P.

(57) ABSTRACT

A power converter apparatus includes a case, a power converter which is in the case and converts input power to predetermined power and output the predetermined power, a first switch positioned in the case and connected to the converter component, a second switch positioned in the case and connected to the converter component, the second switch having a moving component which moves between first and second positions, and a cover which is installed on the case such that the cover covers the first switch and which moves in two mutually different directions relative to the case such that the cover is removed from the case. The cover has a contact portion which makes contact with the moving component of the second switch in the first position and which restricts movement of the cover in one or more of the two directions when the cover is moved in the two directions.

20 Claims, 11 Drawing Sheets

(51) Int. Cl.
 *H02J 3/38* (2006.01)
 *H02M 1/32* (2007.01)

(56) References Cited

FOREIGN PATENT DOCUMENTS

| | | | |
|---|---|---|---|
| EP | 2 675 054 A1 | 12/2013 | |
| EP | 2675054 A1 * | 12/2013 | ............ H05K 7/209 |
| JP | 2000-261177 A | 9/2000 | |
| JP | 2002-257109 A | 9/2002 | |
| JP | 2005-294609 A | 10/2005 | |
| JP | 2010-272559 A | 12/2010 | |
| JP | 2011-117484 A | 6/2011 | |
| JP | 2013-230002 A | 11/2013 | |

OTHER PUBLICATIONS

Combined Office Action and Search Report dated Jul. 11, 2017 in Chinese Patent Application No. 201510447002.X (with unedited computer generated English translation of Office Action and English translation of categories of cited documents).

* cited by examiner

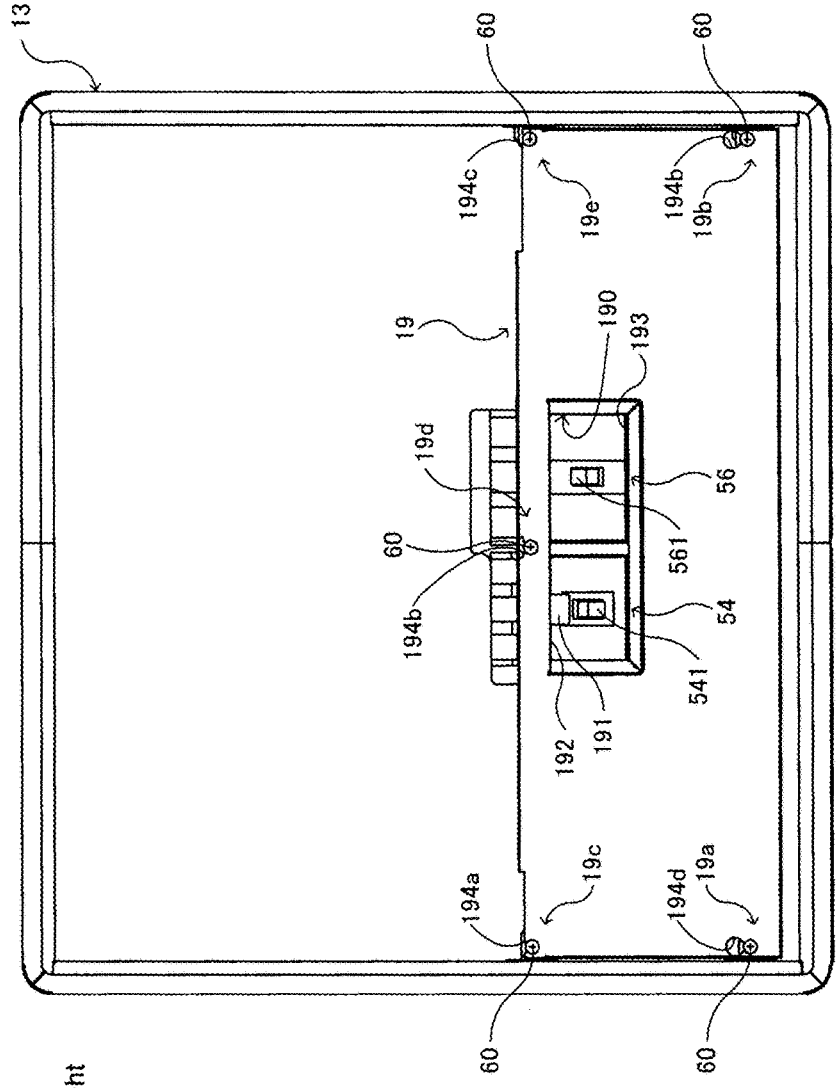
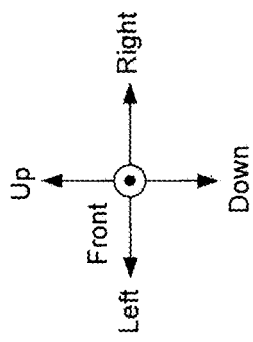
FIG. 4

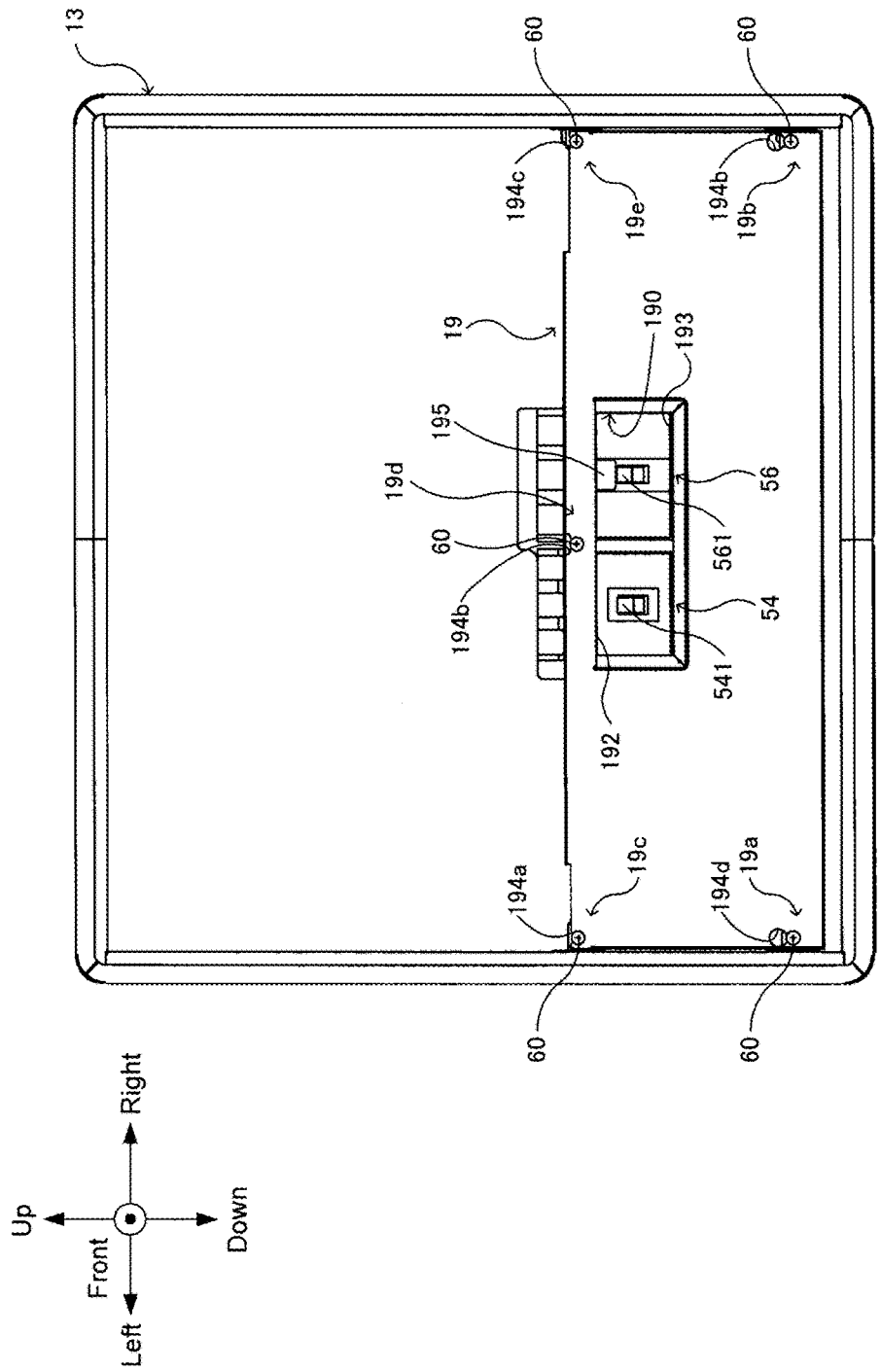

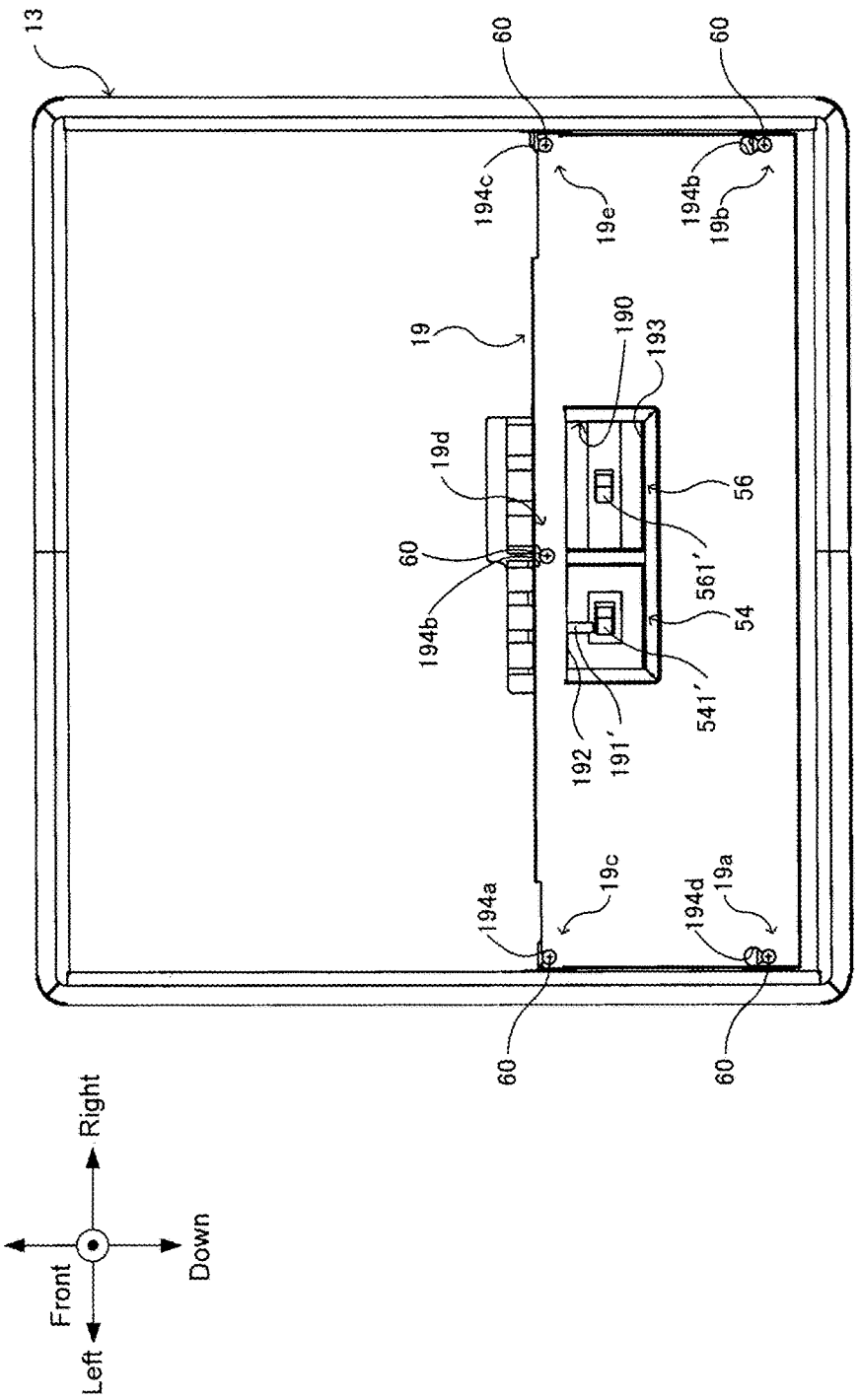

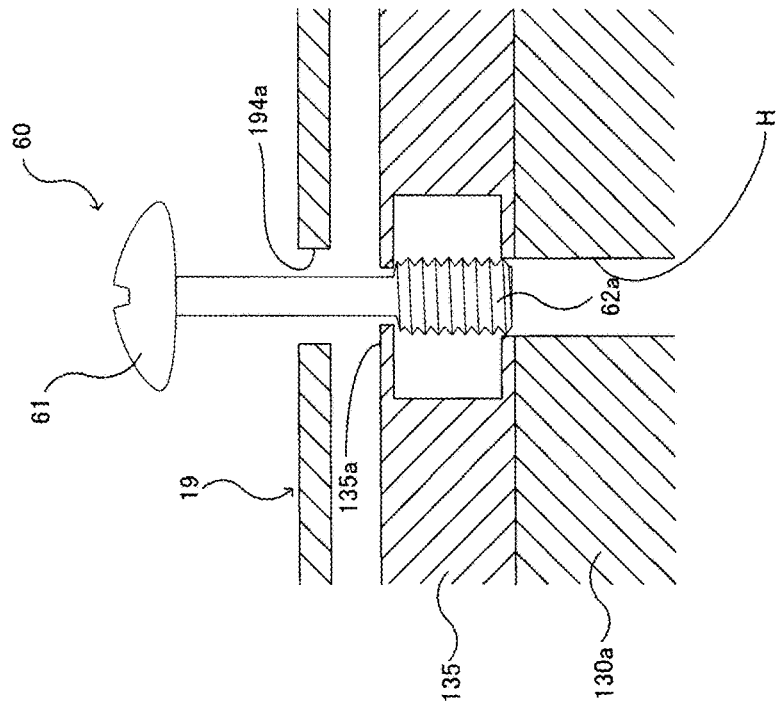
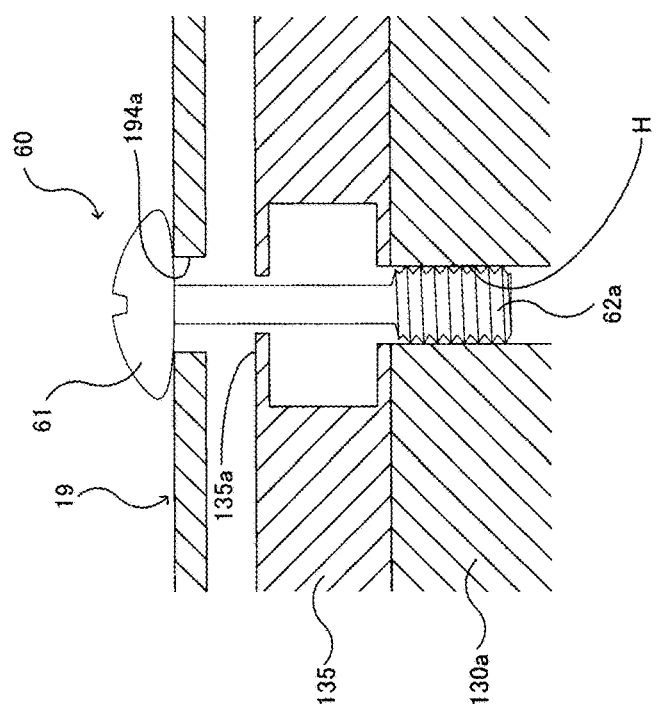

SWITCH COVER FOR POWER CONVERTER AND POWER CONVERSION SYSTEM

CROSS-REFERENCE TO RELATED APPLICATIONS

The present application is based upon and claims the benefit of priority to Japanese Patent Application No. 2014-154146, filed Jul. 29, 2014, the entire contents of which are incorporated herein by reference.

BACKGROUND OF THE INVENTION

Field of the Invention

Embodiments of the disclosure relate to a power converter and a power conversion system.

Description of Background Art

In Japanese Patent Laid-Open Publication No. 2010-272559, a collector box for a solar power generation system, in which a collector switch and input switches are arranged, is described. The entire contents of this publication are incorporated herein by reference.

SUMMARY OF THE INVENTION

According to one aspect of the present invention, a power converter apparatus includes a case, a power converter component which is positioned in the case and converts an input power to a predetermined power and output the predetermined power, a first switch positioned in the case and connected to the power converter component, a second switch positioned in the case and connected to the power converter component, the second switch having a moving component which moves between a first position and a second position, and a cover which is installed on the case such that the cover covers the first switch and which moves in two mutually different directions relative to the case such that the cover is removed from the case. The cover has a contact portion which makes contact with the moving component of the second switch in the first position and which restricts a movement of the cover in one or more of the two mutually different directions when the cover is moved in the two mutually different directions.

According to another aspect of the present invention, a power conversion system includes an external power supply device, and a power converter apparatus connected to the external power supply device and including a case, a power converter component which is positioned in the case and converts an input power to a predetermined power and output the predetermined power, a first switch positioned in the case and connected to the power converter component, a second switch positioned in the case and connected to the power converter component, the second switch having a moving component which moves between a first position and a second position, and a cover which is installed on the case such that the cover covers the first switch and which moves in two mutually different directions relative to the case such that the cover is removed from the case. The cover has a contact portion which makes contact with the moving component of the second switch in the first position and which restricts a movement of the cover in one or more of the two mutually different directions when the cover is moved in the two mutually different directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a plan view illustrating an example of an internal structure of the main body case, and corresponds to a state in which the lever of the input side switch is in an OFF position and removal of the protective cover from the main body case is allowed;

FIG. 9 is a plan view illustrating an example of an internal structure of a main body case in a modified embodiment in which a projection is provided only for an output side switch, and corresponds to a state in which a lever of the output side switch is in an ON position and removal of a protective cover from the main body case is restricted;

FIG. 10 is a plan view illustrating an example of an internal structure of a main body case in a modified embodiment in which a projection restricts a movement of a protective cover in a direction perpendicular to a movement direction of a lever, and corresponds to a state in which a lever of an input side switch is in an ON position and removal of the protective cover from a main body case is restricted; and FIGS. 11A and 11B are cross-sectional views illustrating a structure of a vicinity of a screw hole of a main body case in a modified embodiment in which a screw is avoided from being removed from the main body case.

DETAILED DESCRIPTION OF THE EMBODIMENTS

Figure 1:
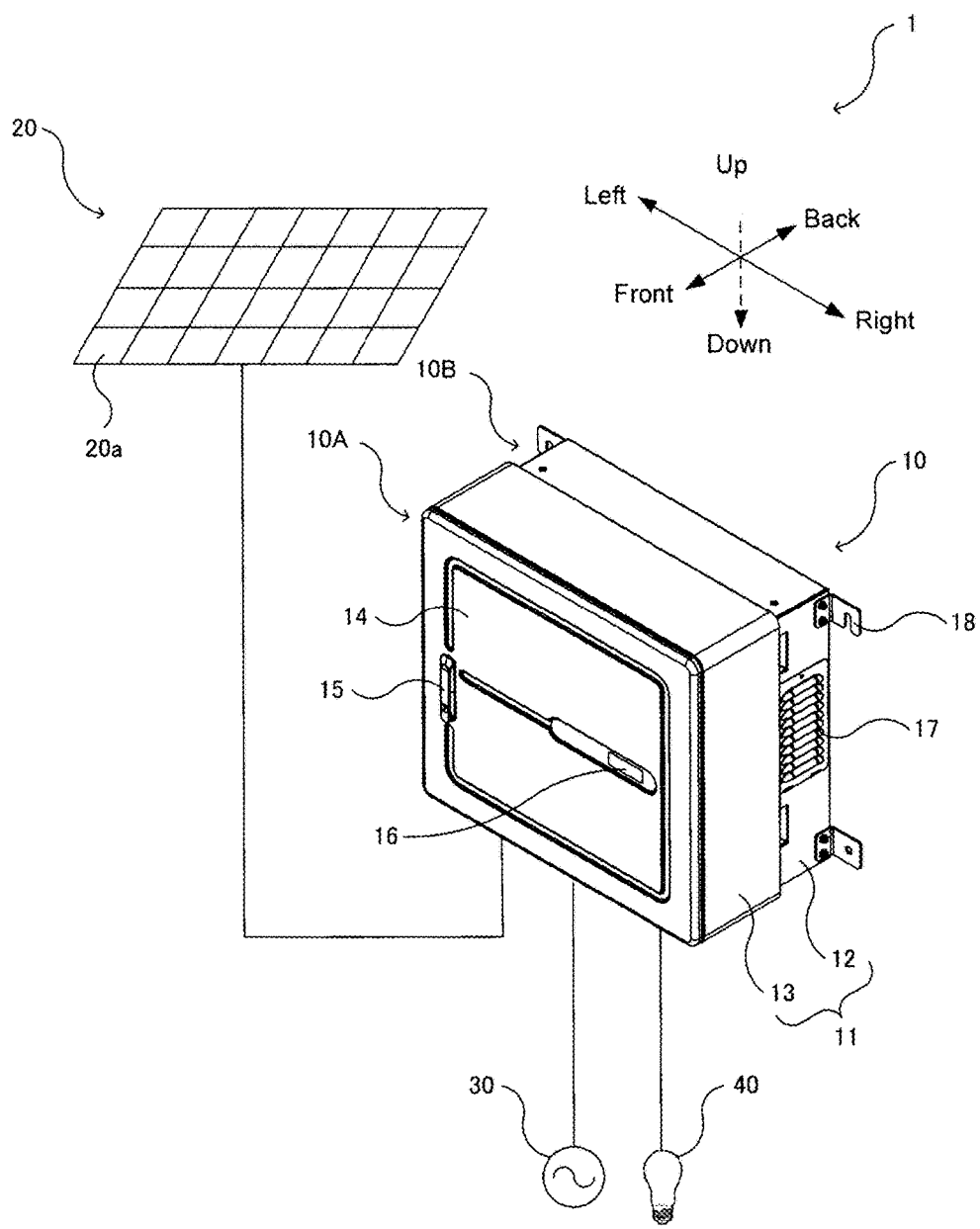
FIG. 1 is a system structural diagram illustrating an example of an overall structure of a power conversion system of an embodiment.

The embodiments will now be described with reference to the accompanying drawings, wherein like reference numerals designate corresponding or identical elements throughout the various drawings.

Further, directions of "front," "back," "left," "right," "up" and "down" that are indicated in the drawings respectively correspond to directions described as "forward,' "backward," "leftward," "rightward," upward" and "downward" in the description of the present specification. However, positional relations between structural components of a power converter of the present embodiment are not limited by the concepts of "front," "back," "left," "right," "up" and "down."

1. Overall Structure of Power Conversion System

First, with reference to FIG. 1, an example of an overall structure of a power conversion system of the present embodiment is described.

As illustrated in FIG. 1, a power conversion system 1 includes an inverter (DC-AC converter) 10, which is an example of a power converter, and a solar cell array 20, which is connected to the inverter 10 and is an example of an external device.

The solar cell array 20 directly converts light energy due to sunlight to a DC power and supplies the DC power to the inverter 10. The solar cell array 20 is structured by arranging multiple interconnected solar cell panels (solar cell modules) (20a), and is installed, for example, on a roof of a building or the like. The solar cell array 20 has, for example seven strings, with a block of solar cell panels (20a) connected in series as one string. Each of the strings is connected to the inverter 10, and each of the strings supplies a DC power to the inverter 10. The number of the strings of the solar cell array 20 is not limited to seven, but may also be another number.

In the present embodiment, a case is described where the solar cell array 20 is used as the external device. However, as the external device, an external device other than the solar cell array 20 may also be used as long as the external device is a device capable of supplying a power to a power converter. For example, as the external device, a battery such as a fuel cell, a power generator such as a wind power generator, or the like, may be used.

The inverter 10 converts a DC power input from each of the strings of the solar cell array 20 to a predetermined AC power (for example, a single-phase AC power) and outputs the AC power to a system power source 30. Further, a terminal 57 for power connection of an electrical appliance 40 is provided in the inverter 10. By connecting from the terminal 57 to the electrical appliance 40, an AC power can be output from the inverter 10 to the electrical appliance 40.

The inverter 10 includes a main body part (10A) and an air channel part (10B). The main body part (1 OA) includes multiple electronic components and a main body case 13 that accommodates the electronic components. The air channel part (10B) includes a duct (not illustrated in the drawings) for forming an air channel and a duct case 12 that accommodates the duct and the like. In the present embodiment, the duct case 12 and the main body case 13 each have a shape of a substantially rectangular cuboid, but may also have other shapes. The duct case 12 and the main body case 13 form a case 11. Further, the case 11 may also be formed by one case.

In the duct case 12, the duct (not illustrated in the drawings) is formed that is connected to an air inlet (not illustrated in the drawings) for cooling air and to an exhaust outlet 17. It is also possible that the part indicated by the reference numeral 17 is the air inlet. Further, mounting brackets 18 for mounting the inverter 10 to a wall surface (not illustrated in the drawings) are provided near four outer corners of the duct case 12. In each of the drawings other than FIG. 1, illustration of the mounting brackets 18 is omitted.

In the main body case 13, an openable and closable face plate 14 is provided that, when it is in a closed state, covers the electronic components arranged in the main body case 13. A handle 15 for performing an opening or closing operation of the face plate 14 and a display 16 that displays various information are provided on the face plate 14.

In the present embodiment, a case is described where the inverter 10 is used as the power converter. However, as the power converter, a power converter other than the inverter 10 may also be used as long as the power converter is a device capable of converting an input power to a predetermined power. For example, as the power converter, a device (AC-DC converter) that converts an AC power to a DC power, a device (DC-DC converter) that converts a DC power to a different DC power, a device (AC-AC converter) that converts an AC power to a different AC power, or the like, may be used.

The above-described overall structure of the power conversion system 1 is merely an example. A structure other the one described above is also possible.

2. Circuit Structure of Inverter

Figure 2:
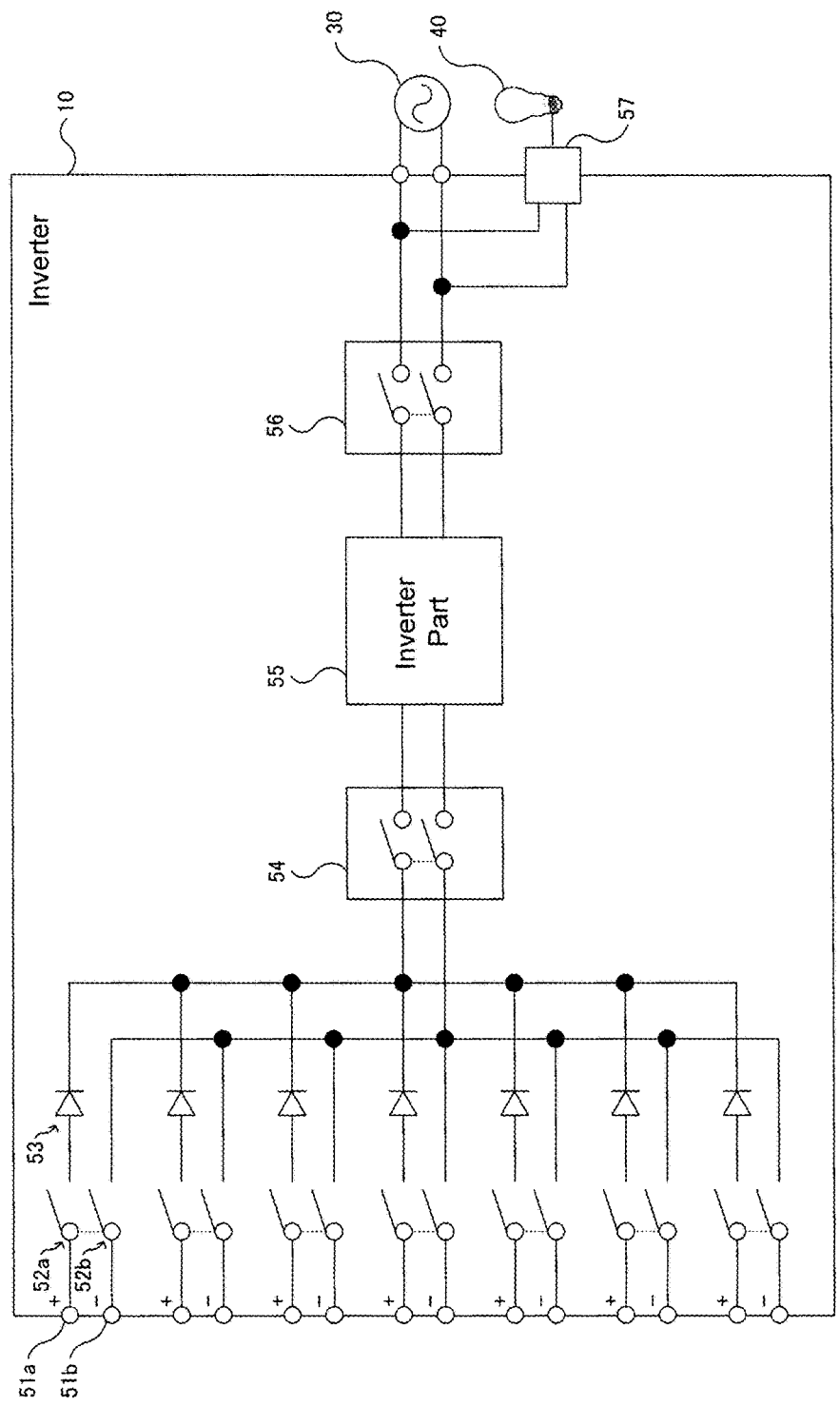
FIG. 2 is a circuit structural diagram illustrating an example of a circuit structure of a power converter.

Next, with reference to FIG. 2, an example of a circuit structure of the inverter 10 is described.

As illustrated in FIG. 2, the inverter 10 includes: a P terminal (51a) and an N terminal (51b) (hereinafter collectively referred to as "terminals (51a, 51b)" or "terminals 51" as appropriate); disconnect switches (52a, 52b) (hereinafter collectively referred to as "disconnect switches 52" as appropriate), which are examples of first switches; a diode 53; an input side switch 54, which is an example of a second switch; an inverter part 55, which is an example of a power converter part; an output side switch 56; and the above-described terminal 57.

The terminals (51a, 51b) are connected to an output side of a string of the solar cell array 20, and input a DC power output from the string. In the present embodiment, for example, seven pairs of terminals (51a, 51b) are provided and are respectively connected to output sides of the seven strings of the solar cell array 20, and respectively input DC powers output from the seven strings.

The disconnect switches (52a, 52b) are connected between the terminals (51a, 51b) and the inverter part 55, and perform opening and closing of an electrical path of a DC power input from a string via the terminals (51a, 51b). That is, when the disconnect switches (52a, 52b) are in an ON state, the electrical path is closed; and when the disconnect switches (52a, 52b) are in an OFF state, the electrical path is opened. The disconnect switches (52a, 52b) are switches that can perform opening and closing of a voltage, but cannot perform opening and closing of a load current (switches that do not have arc-extinguishing capability). In the present embodiment, seven pairs of disconnect switches (52a, 52b), which respectively correspond to the pairs of the terminals (51a, 51b), are provided, and respectively perform opening and closing of electrical paths of the strings. The disconnect switches (52a, 52b) that correspond to the same string are structured to operate in conjunction with each other. However, the disconnect switches (52a, 52b) may also be structured to operate independently.

In the present embodiment, a case is described where, as the first switches, the disconnect switches 52 are used. However, as the first switches, switches other than the disconnect switches 52 may also be used as long as the switches care capable of performing opening and closing of an electrical path. For example, as the first switches, switches and the like that can perform opening and closing of a load current and a short-circuit current (switches that have arc-extinguishing capability) may also be used. Further, in the present embodiment, a case is described where seven pairs of disconnect switches (52a, 52b) are provided so that opening and closing of an electrical path of a DC power from each of the seven strings can be performed. However, for example, in a case where there is one electrical path of a power from an external device, it is also possible that only one first switch is provided.

The diode 53 is connected between the disconnect switches (52a, 52b) and the inverter part 55, and prevents a backflow of a current. In the present embodiment, seven diodes 53 are provided corresponding to the disconnect switches (52a, 52b), and respectively prevent backflows of currents of the strings.

After passing through the respective pairs of disconnect switches (52a, 52b) and the respective diodes 53, DC powers that are respectively input via the respective pairs of terminals (51a, 51b) from the seven strings are collected as one DC power.

The input side switch 54 is connected on an input side of the inverter part 55 in the electrical path of the DC power after the power collection, and performs opening and closing of the electrical path of the DC power to be input to the inverter part 55 after the power collection. That is, when the input side switch 54 is in an ON state, the electrical path is closed; and when the input side switch 54 is in an OFF state, the electrical path is opened. As the input side switch 54, a switch capable of performing opening and closing of a load current and a short-circuit current (switch that has arc-extinguishing capability) is used, however, other types of switches may also be used.

The inverter part 55 is accommodated in the main body case 13, and has semiconductor elements such as IGBTs. The inverter part 55 may also be accommodated in the duct case 12. The inverter part 55 converts the DC power after the power collection, which is an input power, to a predetermined AC power (such as a single-phase AC power), which is a predetermined power, and outputs the AC power. In the present embodiment, the inverter 10 is used as a power converter. Therefore, the inverter part 55 is used as a power converter part. However, when another device is used as a power converter, a suitable power converter part in accordance with the type of another device may be used.

The output side switch 56 is connected to an output side of the inverter part 55, and performs opening and closing of an electrical path of the AC power output from the inverter part 55. That is, when the output side switch 56 is in an ON state, the electrical path is closed; and when the output side switch 56 is in an OFF state, the electrical path is opened. As the output side switch 56, a switch capable of performing opening and closing of a load current and a short-circuit current (switch that has arc-extinguishing capability) is used, however, other types of switches may also be used.

In the present embodiment, a case is described where two switches, that is, the input side switch 54 and the output side switch 56 (hereinafter collectively referred to as "switches (54, 56)" as appropriate), are provided. However, it is also possible that one of the switches (54, 56) is omitted and only one switch is provided. Or, it is also possible that three or more switches are provided.

After passing through the output side switch 56, the AC power output from the inverter part 55 is input to the system power source 30. Further, when a power plug is plugged into the terminal 57, after passing through the output side switch 56, the AC power output from the inverter part 55 can also be input to the electrical appliance 40.

The above-described circuit structure of the inverter 10 is merely an example. A circuit structure other the one described above is also possible.

The disconnect switches (52a, 52b), the input side switch 54 and the output side switch 56 are respectively accommodated in the main body case 13. Arrangement positions of the disconnect switches (52a, 52b), the input side switch 54 and the output side switch 56 are not limited to inside the main body case 13, but may also be on an outer surface of the main body case 13 or on the duct case 12 side.

3. Internal Structure of Main Body Case

Next, with reference to FIG. 3-6, an example of an internal structure of the main body case 13 is described. In FIG. 3-6, a state in which the face plate 14 is removed from the main body case 13 is illustrated; and illustration of the electronic components that are arranged in the main body case 13 is omitted as appropriate. As will be described in detail later, FIG. 3 corresponds to an example of a state in which a lever of the input side switch is in an ON position and removal of a protective cover from the main body case 13 is restricted; and FIG. 4 corresponds to an example of a state in which the lever of the input side switch is in an OFF position and removal of the protective cover from the main body case 13 is allowed. Further, FIG. 5 corresponds to an example of a state in which the protective cover has moved downward relative to the main body case 13; and FIG. 6 corresponds to an example of a state in which the protective cover has been removed from the main body case 13.

As illustrated in FIG. 3-6, the disconnect switches (52a, 52b), the input side switch 54, the output side switch 56, and a protective cover 19 (which is an example of a cover) are respectively accommodated in the main body case 13.

3-1. Disconnect Switches

The disconnect switches (52a, 52b) are arranged, for example, at a lower left portion in the main body case 13 as a switch package 520 that is structured by arranging the disconnect switches (52a, 52b) in one row. In the switch package 520, disconnect switches (52a, 52b) corresponding to a same string are adjacent to each other. The arrangement position of the switch package 520 in the main body case 13 is not limited to the lower left portion, but may also be another position. Further, it is also possible that the disconnect switches (52a, 52b) are not arranged as the switch package 520, but are separately arranged.

The switch package 520 has a lever 521 for each of the disconnect switches 52, the lever 521 being an operation part for performing a switch operation of an operation state. The lever 521 is movable between an ON position, at which a corresponding disconnect switch 52 is in an ON state, and an OFF position, at which the corresponding disconnect switch 52 is in an OFF state. In the present embodiment, the ON position of the lever 521 is positioned on an upper side and the OFF position is positioned on a lower side, so the lever 521 is movable in an up-down direction. That is, a movement direction of the lever 521 is the up-down direction. It is also possible that the positional relation between the ON position and the OFF position of the lever 521 is opposite to the one described above. Further, the movement direction of the lever 521 is not limited to the up-down direction, but may also be a left-right direction or the like. Further, the operation part of each of the disconnect switches 52 is not limited to the lever 521, but may also be a push button or the like.

Further, as described above, the disconnect switches (52a, 52b) are structured such that disconnect switches corresponding to a same string operate in conjunction with each other. Therefore, when the lever 521 of one of a pair of disconnect switches 52 corresponding to a string (for example, a disconnect switch (52*a*)) is operated, the lever 521 of the other disconnect switch 52 (for example, a disconnect switch (52*b*)) adjacent to the previously mentioned disconnect switch 52 moves in conjunction with the movement of the previously mentioned lever 521.

3-2. Input Side Switch and Output Side Switch

The input side switch 54 is arranged on a right side of the switch package 520 in the main body case 13. The arrangement position of the input side switch 54 in the main body case 13 is not limited to the right side of the switch package 520, but may also be another position.

The input side switch 54 has a lever 541, which is an example of a moving part for performing a switch operation of an operation state. The lever 541 is movable, for example, by a rotating operation or sliding operation, between an ON position, which is an example of a first position at which the input side switch 54 is in an ON state, and an OFF position, which is an example of a second position at which the input side switch 54 is in an OFF state. In the present embodiment, the ON position of the lever 541 is positioned on an upper side and the OFF position is positioned on a lower side, so the lever 541 is movable in the up-down direction. That is, a movement direction of the lever 541 is the up-down direction. It is also possible that the positional relation between the ON position and the OFF position of the lever 541 is opposite to the one described above. Further, the movement direction of the lever 541 is not limited to the up-down direction, but may also be the left-right direction or the like. Further, the moving part of the input side switch 54 is not limited to a lever, but may also be a push button or the like.

The output side switch 56 is arranged on a right side of (in this example, adjacent to) the input side switch 54 in the main body case 13. The arrangement position of the output side switch 56 in the main body case 13 is not limited to the right side of the input side switch 54, but may also be another position.

The output side switch 56 has a lever 561, which is an example of a moving part for performing a switch operation of an operation state. The lever 561 is movable, for example, by a rotating operation or sliding operation, between an ON position, which is an example of a first position at which the output side switch 56 is in an ON state, and an OFF position, which is an example of a second position at which the output side switch 56 is in an OFF state. In the present embodiment, the ON position of the lever 561 is positioned on an upper side and the OFF position is positioned on a lower side, so the lever 561 is movable in the up-down direction. That is, a movement direction of the lever 561 is the up-down direction. It is also possible that the positional relation between the ON position and the OFF position of the lever 561 is opposite to the one described above. Further, the movement direction of the lever 561 is not limited to the up-down direction, but may also be the left-right direction or the like. Further, the moving part of the output side switch 56 is not limited to a lever, but may also be a push button or the like.

3-3. Protective Cover

The protective cover 19 is removably installed to the main body case 13 such that the switch package 520 is covered when the protective cover 19 is installed to the main body case 13. The protective cover 19 can be removed from the main body case 13 by moving the protective cover 19 in two mutually different directions relative to the main body case 13. The two movement directions for removing the protective cover 19 from the main body case 13 are not particularly limited. However, in this example, a case is described as an example where the two movement directions are a downward direction and a forward direction, and the protective cover 19 is moved first in the downward direction and then in the forward direction. The downward direction, which is an initial movement direction of the protective cover 19, is one direction of a plate surface direction of the protective cover 19, and is also a direction along the movement direction of the levers (541, 561) of the switches (54, 56). Further, the forward direction, which is a second movement direction of the protective cover 19, is one direction of a plate thickness direction of the protective cover 19. That is, when the protective cover 19 is removed from the main body case 13, the protective cover 19 is first moved in the downward direction relative to the main body case 13, and is thereafter moved in the forward direction.

In a state in which the protective cover 19 is installed to the main body case 13, the switch package 520 is not exposed and operations of the levers 521 of the disconnect switches 52 are impossible. By moving the protective cover 19 in the two directions relative to the main body case 13 to remove the protective cover 19 to expose the switch package 520, the operations of the levers 521 of the disconnect switches 52 are possible.

3-3-1. Overall Structure and Holding Structure of Protective Cover

In the present embodiment, the protective cover 19 has, for example, a substantially rectangular plate-like shape of which a longitudinal dimension substantially coincides with an inner dimension of the main body case 13 in the left-right direction and a lateral dimension is, for example, smaller than a half of an inner dimension of the main body case 13 in the up-down direction. The shape and dimensions of the protective cover 19 are not limited to those of such a substantially rectangular plate-like shape or the like as long as that they are a shape and dimensions that allow the switch package 520 to be covered when the protective cover 19 is installed to the main body case 13. A substantially rectangular opening 190 that allows the levers (541, 561) of the switches (54, 56) to be inserted therethrough is formed in the protective cover 19. In a case or the like where positions corresponding to the levers (541, 561) are not covered when the protective cover 19 is installed to the main body case 13, it is also possible that the opening 190 is not formed in the protective cover 19. Then, the protective cover 19 is removably installed to a lower portion of the main body case 13 such that the switch package 520 is covered and the levers (541, 561) are inserted through the opening 190 when the protective cover 19 is installed to the main body case 13.

That is, in a state in which the protective cover 19 is installed to the main body case 13, the switch package 520 is not exposed and operations of the levers 521 of the disconnect switches 52 are impossible; however, the levers (541, 561) of the switches (54, 56) are exposed and operations of the levers (541, 561) are possible.

Further, supports for supporting the protective cover 19 are provided in a lower portion in the main body case 13. Positions, shapes, a number and the like, of the supports are not particularly limited. However, in this example, a case is described as an example where the positions, the shapes, the number and the like of the supports are as follows.

Figure 6:
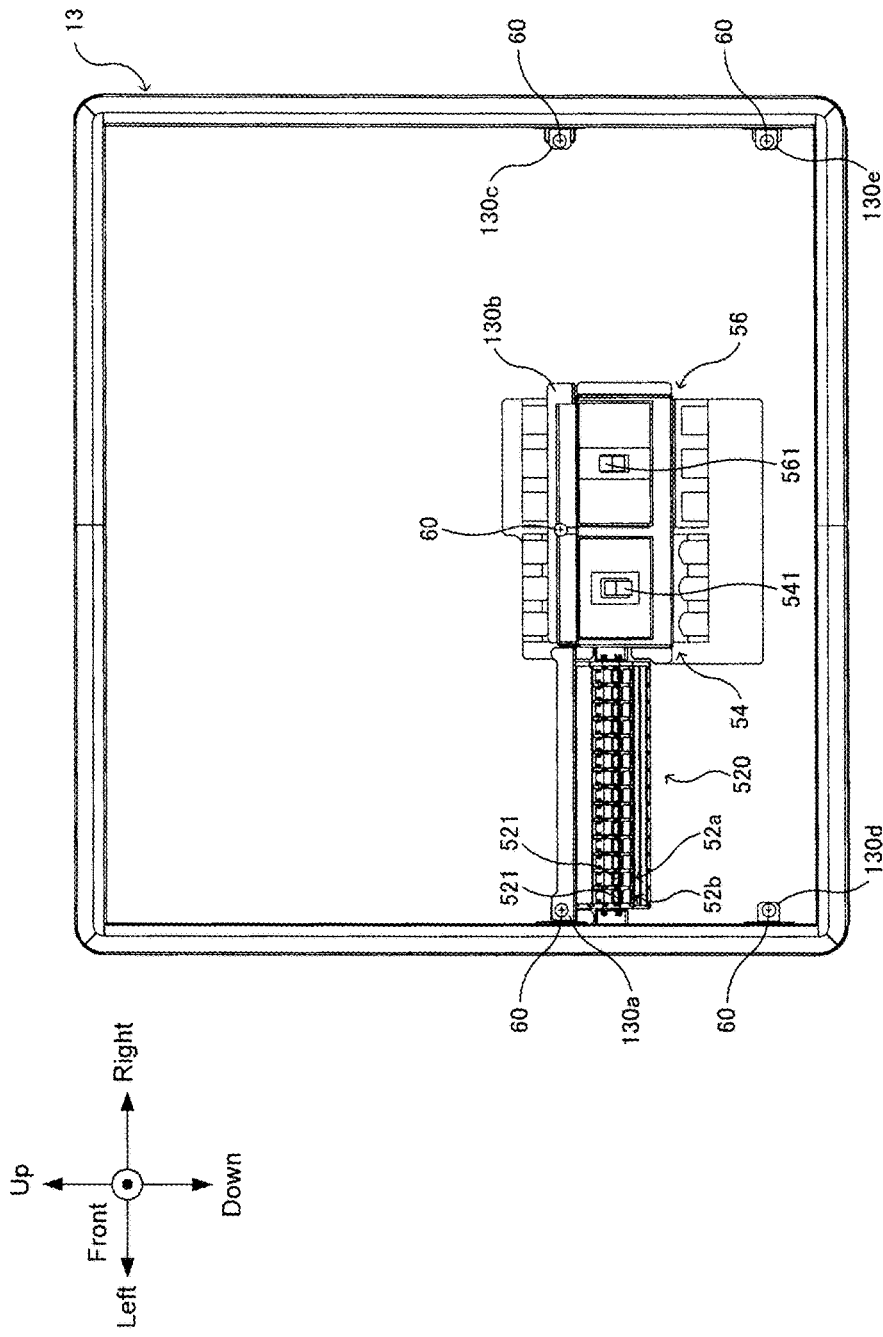
FIG. 6 is a plan view illustrating an example of an internal structure of the main body case, and corresponds to a state in which the protective cover has been removed from the main body case.

As illustrated in FIG. 6, for example, five supports (130*a*, 130*b*, 130*c*, 130*d*, 130*e*) are provided in the lower portion in the main body case 13. On a front surface of each of the supports (130*a*-130*e*), a screw hole (not illustrated in the drawings) is formed into which a screw 60, which is an example of a holding member, is screwed.

Figure 7A:
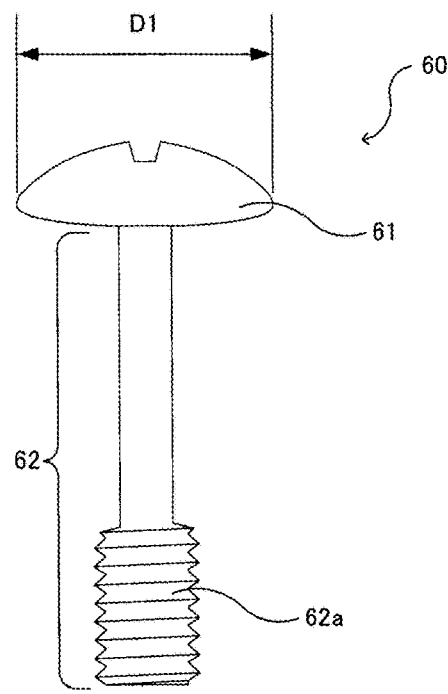
FIG. 7A is a side view illustrating an example of a shape of a screw.

FIG. 7A illustrates an example of a shape of the screw 60. As illustrated in FIG. 7A, the screw 60 has a head part 61 of a diameter (D1), and a substantially column-shaped shaft part 62 having a diameter smaller than the diameter (D1). The shaft part 62 has a threaded part (62*a*) on a front end side, which is on an opposite side of the head part 61, a screw thread being cut on the threaded part (62*a*).

The support (130*a*) is provided in a portion on an upper side of the switch package 520 in the main body case 13 along the left-right direction. The screw hole is formed in a left end portion of the support (130*a*), that is, in a portion on a lower side of a center of a left side in the main body case 13. The support (130*b*) is provided on a right side of the support (130*a*) in the main body case 13 and in a portion on an upper side of the levers (541, 561) of the switches (54, 56) along the left-right direction. The screw hole is formed in a substantially central portion of the support (130*b*), that is, on a lower side of a center in the up-down direction in the main body case 13 and in a substantially central portion in the left-right direction. The support (130*c*) is provided in a portion on a lower side of a center of a right side in the main body case 13. The screw hole is formed in a substantially central portion of the support (130*c*). The support (130*d*) is provided near a lower end of the left side in the main body case 13. The screw hole is formed in a substantially central portion of the support (130*d*). The support (130*e*) is provided near a lower end of the right side in the main body case 13. The screw hole is formed in a substantially central portion of the support (130*e*). The positions and the number of the screw holes are not particularly limited, and may be different from those described above.

Long holes into which the screws 60 are respectively inserted through are formed in the protective cover 19 at positions corresponding to the above-described five screw holes. That is, the screws 60 are respectively inserted through the long holes of the protective cover 19 and screwed into the screw holes of the main body case 13 and, thereby, the protective cover 19 is held on the main body case 13. Specifically, in a tightened state, that is, in a state of being deeply screwed into the screw holes, the screws 60 hold the protective cover 19 on the main body case 13 in a fixed state in which the protective cover 19 is immovable relative to the main body case 13. On the other hand, in a loosened state, that is, in a state of being shallowly screwed into the screw holes, the screws 60 hold the protective cover 19 on the main body case 13 in a semi-fixed state in which the protective cover 19 is movable relative to the main body case 13. When the screws 60 are removed from the screw holes, the protective cover 19 is in a non-fixed state and becomes removable from the main body case 13.

Shapes of the long holes are not particularly limited as long as they are shapes that allow the screws 60 to hold the protective cover 19 in the fixed state or the semi-fixed state on the main body case 13. However, in this example, a case is described where the long holes have the following shapes.

That is, the long holes (194*d*, 194*e*) that are each oriented along the up-down direction are respectively formed at positions corresponding to the screw holes of the supports (130*d*, 130*e*) of the protective cover 19, that is, in a vicinity of a lower left corner (19*a*) and in a vicinity of a lower right corner (19*b*). The lower left corner (19*a*) and the lower right corner (19*b*) correspond to an example of two corners positioned on both sides of one side. Further, it is also possible that the screw holes of the supports (130*d*, 130*e*) correspond to positions other the vicinity of the lower left corner (19*a*) and the vicinity of the lower right corner (19*b*) of the protective cover 19.

Figure 7B:
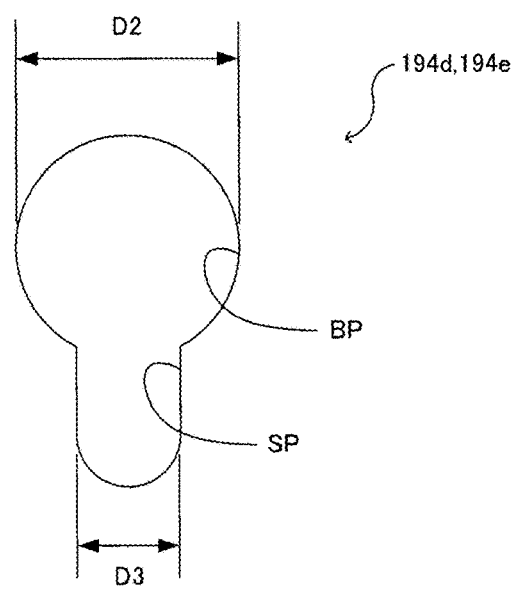
FIG. 7B is a plan view illustrating an example of a shape of a long hole.

FIG. 7B illustrates an example of a shape of the long holes (194*d*, 194*e*). As illustrated in FIG. 7B, the long holes (194*d*, 194*e*) are each a so-called Dharma hole (or keyhole) that has a large-diameter part (BP) on one end having a diameter (D2) larger than the diameter (D1) of the head part 61 of the screw 60 and has a small-diameter part (SP) on the other end having a diameter (D3) smaller than the diameter (D1).

Figure 5:
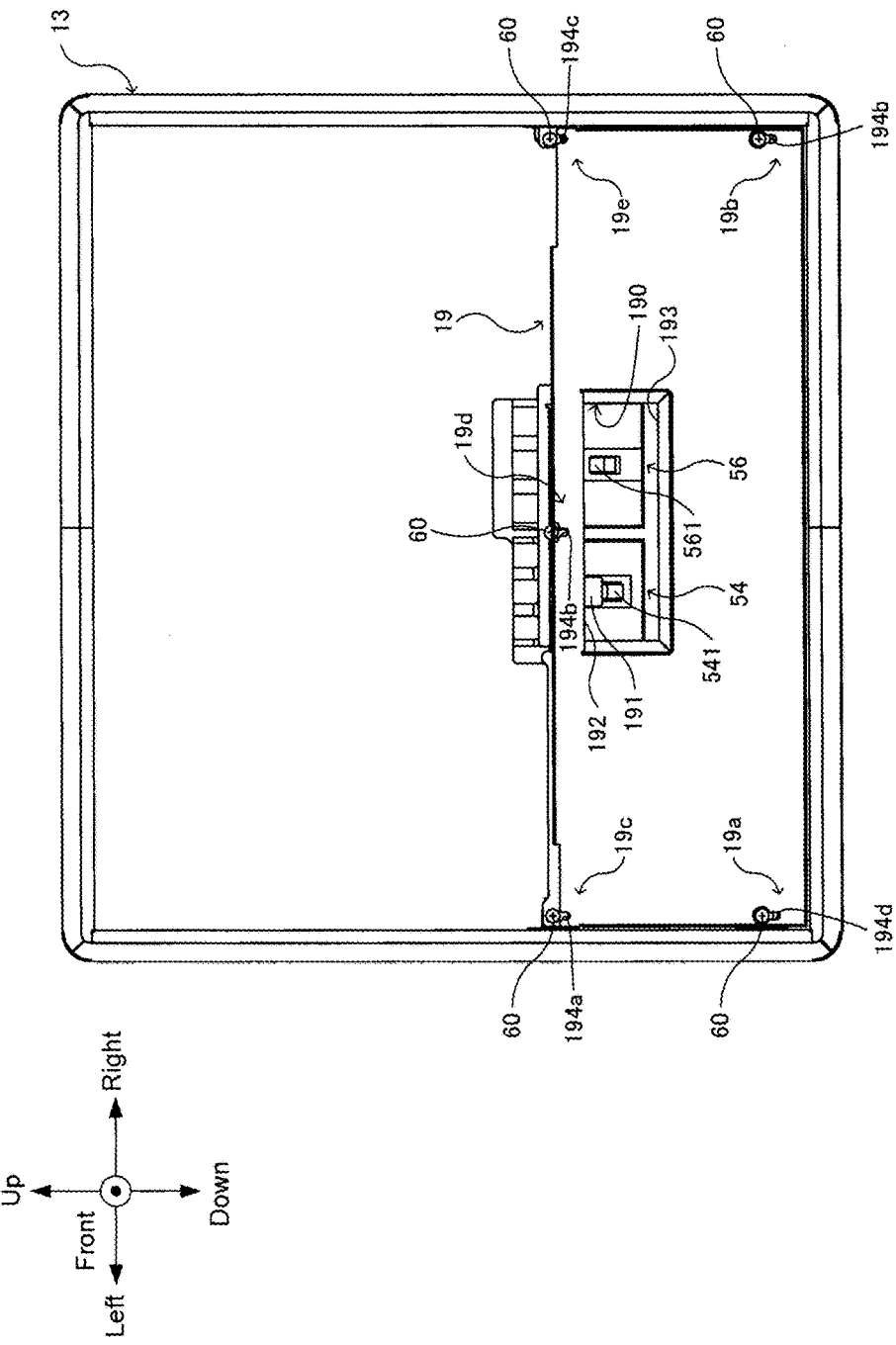
FIG. 5 is a plan view illustrating an example of an internal structure of the main body case, and corresponds to a state in which the protective cover has been moved downward relative to the main body case.

Further, as illustrated in FIG. 5, cutouts (194*a*, 194*b*, 194*c*) that each have a shape of a long hole of a diameter smaller than the diameter (D1) of the head part 61 of the screw 60 are respectively formed at positions corresponding to the screw holes of the supports (130*a*, 130*b*, 130*c*) of the protective cover 19, that is, in a vicinity of an upper left corner (19*c*), a substantially central portion (19*d*) of an upper side, and a vicinity of an upper right corner (19*e*). The upper left corner (19*c*) and the upper right corner (19*e*) correspond to an example of the other two corners. Further, it is also possible that, instead of the cutouts (194*a*, 194*b*, 194*c*), long holes of other shapes such as Dharma holes similar to the long holes (195*a*, 195*b*) are formed in the vicinity of the upper left corner (19*c*), the substantially central portion (19*d*) of the upper side and the vicinity of the upper right corner (19*e*) of the protective cover 19. Further, it is also possible that the screw holes of the supports (130*a*, 130*b*, 130*c*) respectively correspond to positions other than the vicinity of the upper left corner (19*c*), the substantially central portion (19*d*) of the upper side and the vicinity of the upper right corner (19*e*) of the protective cover 19.

That is, when the protective cover 19 is not removed from the main body case 13, the screws 60 are respectively inserted through the cutouts (194*a*-194*c*) and the long holes (194*d*, 194*e*) of the protective cover 19 so that the head parts 61 engage with the cutouts (194*a*-194*c*) and the small-diameter parts (SP) of the long holes (194*d*, 194*e*), and deeply screwed into the screw holes of the main body case 13, and thereby the protective cover 19 is held in the fixed state on the main body case 13.

When the protective cover 19 is removed from the main body case 13, the screws 60 are respectively loosened from the screw holes, and the protective cover 19 is in a state of being held in the semi-fixed state on the main body case 13. Thereafter, the protective cover 19 is moved downward relative to the main body case 13. As a result, the protective cover 19 is in a state in which the head parts 61 of the screws 60 are respectively arranged outside the cutouts (194*a*-194*c*) and in the large-diameter parts (BP) of the long holes (194*d*, 194*e*). Thereafter, the protective cover 19 is moved forward relative to the main body case 13, and thereby the protective cover 19 is removed from the main body case 13.

In the present embodiment, a case is described where the screws 60 are used as the holding members. However, as the holding members, members other than the screws 60 may also be used as long as the members are capable of holding the protective cover 19 in the fixed state or the semi-fixed state on the main body case 13.

3-3-2. Projection of Protective Cover

Further, in the present embodiment, a projection 191, which is an example of a contact part, is provided in the protective cover 19. The projection 191 restricts the removal of the protective cover 19 from the main body case 13 according to the position of the lever 541 of the input side switch 54. That is, the projection 191 corresponds to an example of a measure that restricts the removal of the cover from the case 11. Specifically, when the protective cover 19 is removed by moving the protective cover 19 in the above-described two directions, the projection 191 comes into contact with the lever 541 of the input side switch 54 in the ON position so that, among the movements of the protective cover 19 in the two directions, an initial downward movement is restricted. That is, a movement direction that is restricted by the projection 191 of the protective cover 19 is the downward direction. It is also possible that the projection 191 comes into contact with the lever 541 in the ON position so that, among the movements of the protective cover 19 in the two directions, a second forward movement is restricted. Further, it is also possible that the projection 191 comes into contact with the lever 541 in the ON position so that both the movements of the protective cover 19 in the two directions are restricted. Further, it is also possible that, in place of or in addition to, the projection 191, a projection that comes into contact with the lever 561 of the output side switch 56 in the ON position is provided in the protective cover 19 (details will be described later; see FIGS. 8 and 9).

The projection 191 projects toward the lever 541 from an edge 192 that corresponds to an upper side among two up and down sides of the opening 190. That is, the two up and down sides of the opening 190 correspond to an example of two sides in a movement direction of a moving part, and the upper side of the opening 190 corresponds to an example of a side on a first position side. In a case where the relation between the ON position and the OFF position of the lever 541 is opposite to the one described above, that is, in a case or the like where the ON position of the lever 541 is positioned on the lower side, the projection 191 may project toward the lever 541 from an edge 193 that corresponds to the lower side of the opening 190. Further, in the present embodiment, the lever 541 is inserted through the opening 190. Therefore, the projection 191 is formed to project toward the lever 541 from an inner edge (in this example, the edge 192 of the opening 190) of the protective cover 19. However, in a case or the like where the lever 541 is positioned on an outer side (for example, lower side) of the protective cover 19, the projection 191 may project toward the lever 541 from an outer edge (for example, lower edge) of the protective cover 19.

In the present embodiment, a case is described where the contact part is the projection. However, the present invention is not limited to this. That is, when the protective cover 19 is removed by moving the protective cover 19 in the two directions, the contact part may be a portion that comes into contact with the moving part of the second switch in the first position so as to restrict at least movement in one direction among the movements of the protective cover 19 in the two directions. For example, the contact part may be an edge or the like of the opening 190.

Figure 3:
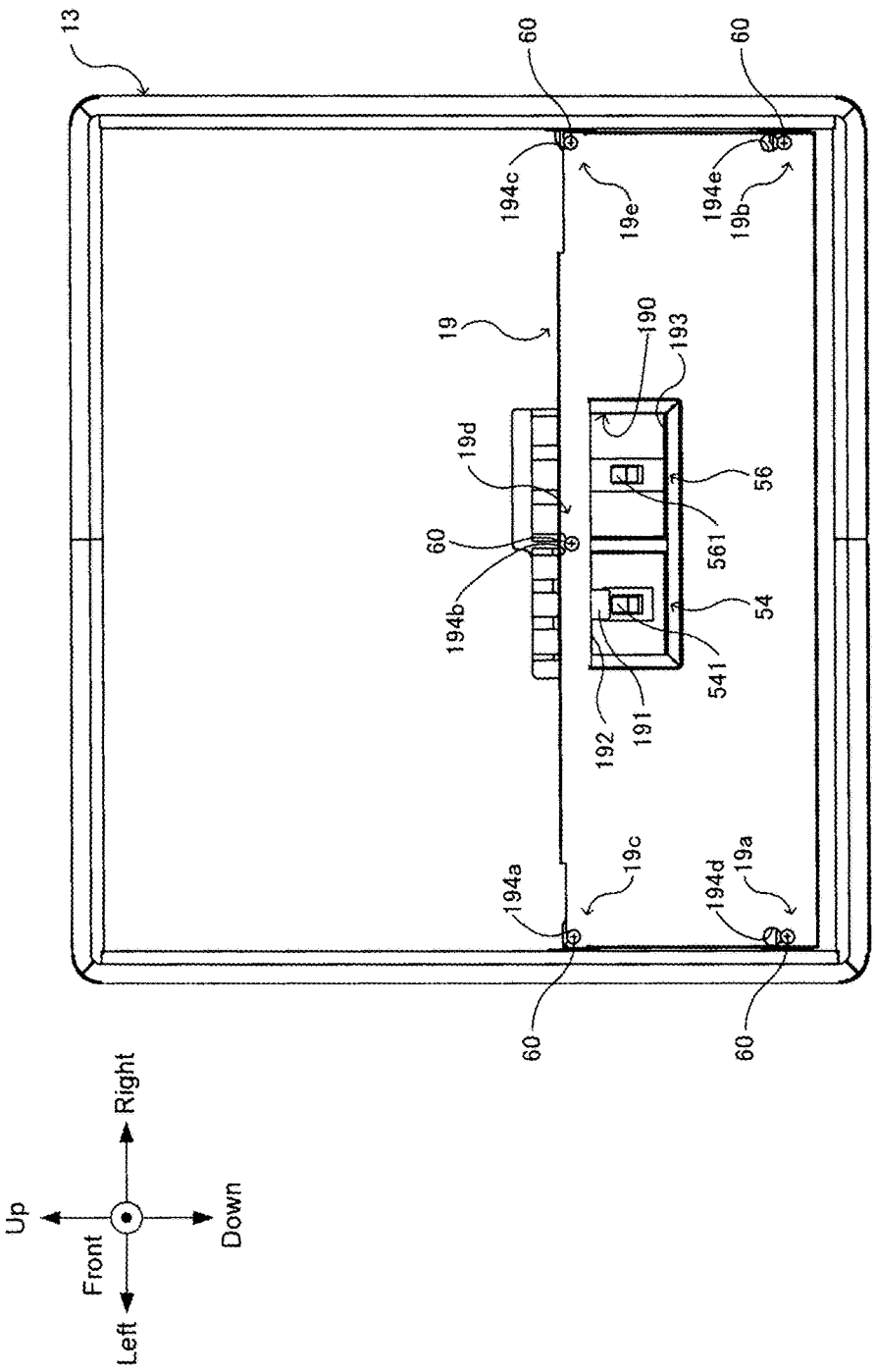
FIG. 3 is a plan view illustrating an example of an internal structure of a main body case, and corresponds to a state in which a lever of an input side switch is in an ON position and removal of a protective cover from the main body case is restricted.

That is, when the lever 541 of the input side switch 54 is in the ON position as illustrated in FIG. 3, the projection 191 is in contact with the lever 541 and the downward movement of the protective cover 19 is restricted; and, together with this, the head parts 61 of the screws 60 engage with the cutouts (194a-194c) and the small-diameter parts (SP) of the long holes (194d, 194e) of the protective cover 19, and the forward movement of the protective cover 19 is restricted. Therefore, removal of the protective cover 19 becomes impossible, and operations of the levers 521 of the disconnect switches 52 that are covered by the protective cover 19 become impossible.

On the other hand, when the lever 541 of the input side switch 54 is in the OFF position as illustrated in FIG. 4, the downward movement of the protective cover 19 is allowed. Therefore, in this case, by moving the protective cover 19 downward relative to the main body case 13, the state (illustrated in FIG. 5) is achieved in which the head parts 61 of the screws 60 are respectively arranged outside the cutouts (194a-194c) of the protective cover 19 and in the large-diameter parts (BP) of the long holes (194d, 194e), and thereby, the forward movement of the protective cover 19 is allowed. Then, in this case, by moving the protective cover 19 forward relative to the main body case 13, the state (illustrated in FIG. 6) in which the protective cover 19 is removed from the main body case 13 can be achieved. In this case, the switch package 520 is exposed. Therefore, operations of the levers 521 of the disconnect switches 52 become possible.

4. Effects of Present Embodiment

As described above, the inverter 10 of the present embodiment is structured to have the protective cover 19 that can be removed from the case 11 (the main body case 13 in the above embodiment) by moving the protective cover 19 in the two mutually different directions relative to the case 11. When the protective cover 19 is removed by moving the protective cover 19 in the two directions, the contact part (the projection 191 in the above embodiment) comes into contact with the lever 541 of the input side switch 54 in the ON position so that at least movement in one direction among the movements of the protective cover 19 in the two directions is restricted. As a result, when the lever 541 of the input side switch 54 is in the ON position, the contact part comes into contact with the lever 541 and at least movement in one direction of among the movements of the protective cover 19 in the two directions is restricted. Therefore, removal of the protective cover 19 is prevented. Therefore, operations of the disconnect switches 52 can be inhibited. On the other hand, when the lever 541 of the input side switch 54 is in the OFF position, movements of the protective cover 19 in the two directions both are not related. Therefore, the protective cover 19 can be removed. Therefore, operations of the disconnect switches 52 become possible. Thus, as in the inverter 10 of the present embodiment, in a case where it is necessary to operate the lever 541 of the input side switch 54 to the OFF position in advance when the disconnect switches 52 are operated, an erroneous operation of a switch can be prevented. As a result, damage to a component or the like can be prevented and safety can be improved. For example, welding of the disconnect switches 52 due to occurrence of arc, formation of an oxide film, or the like, can be prevented; and an operator can be protected against electrical shock, burns and the like, and thus safety can be improved.

Further, in the present embodiment, in particular, the inverter 10 has the screws 60 that hold the protective cover 19 on the case 11 in the fixed state in which the protective cover 19 is immovable relative to the case 11 or in the semi-fixed state in which the protective cover 19 is movable relative to the case 11. When the protective cover 19 is held in the semi-fixed state, the contact part (the projection 191 in the above embodiment) comes into contact with the lever 541 in the ON position so as to restrict the movement of the protective cover 19. As a result, by operating the lever 541 to the OFF position, the protective cover 19 can be installed or removed after being put in the semi-fixed state (in which the screws 60 are loosened), without being put from the fixed state (in which the screws 60 are tightened) to the non-fixed state (in which the screws 60 are removed from the screw holes). That is, the protective cover 19 can be installed or removed by only loosening the screws 60 without removing the screws 60 from the screw holes. Therefore, workability in installing and removing the protective cover 19 can be improved.

Further, in the present embodiment, in particular, the contact part (the projection 191 in the above embodiment) restricts the movement of the protective cover 19 in the plate surface direction. As a result, the following effects are achieved. That is, suppose that the contact part restricts movement of the protective cover 19 in the plate thickness direction (for example, the forward direction), there is a possibility that the restriction of the movement becomes unstable, such as that the protective cover 19 is inclined when the contact part comes into contact with the lever 541. In contrast, in the case where the contact part restricts the movement of the protective cover 19 in the plate surface direction, when the contact part comes into contact with the lever 541, due to engagement with the main body case 13, inclination or the like of the protective cover 19 is prevented and the movement can be stably restricted. Therefore, an effect of preventing the protective cover 19 from being removed can be enhanced.

Further, in the present embodiment, in particular, the contact part (the projection 191 in the above embodiment) restricts the movement of the protective cover 19 in a direction along the movement direction of the lever 541. In this way, by allowing the movement direction of the lever 541 and the movement direction of the protective cover 19 to match with each other, the contact part can have a simple structure in which a positional change of the lever 541 is effectively utilized. Further, a degree of freedom in design for the projection 191 can be improved.

Further, in the present embodiment, in particular, the screw holes into which the screws 60 are respectively screwed are formed in the case 11; and the long holes (194d, 194e) that are each oriented along the direction of the movement that is restricted by the contact part (the projection 191 in the above embodiment) are formed in the protective cover 19 at positions corresponding to the screw holes. The long holes (194d, 194e) each have the large-diameter part (BP) on one end having a diameter larger than that of the head part 61 of the screw 60 and the small-diameter part (SP) on the other end having a diameter smaller than that of the head part 61. As a result, when the lever 541 of the input side switch 54 is in the ON position, the contact part is in contact with the lever 541 and restricts the movement of the protective cover 19 in the plate surface direction; and the head parts 61 of the screws 60 respectively engage with the small-diameter parts (SP) of the long holes (194d, 194e) of the protective cover 19 and restrict the movement of the protective cover 19 in the plate thickness direction. That is, the movements of the protective cover 19 in the above two directions are both restricted. Therefore, removal of the protective cover 19 is prevented, and operations of the disconnect switches 52 can be inhibited. On the other hand, when the lever 541 of the input side switch 54 is in the OFF position, the movement of the protective cover 19 in the plate surface direction is allowed. Therefore, due to the movement of the protective cover 19 in the plate surface direction, the head parts 61 of the screws 60 respectively move to the large-diameter parts (BP) of the long holes (194d, 194e) and the movement of the protective cover 19 in the plate thickness direction is allowed. That is, the movements of the protective cover 19 in the above two directions are both allowed. Therefore, the protective cover 19 can be removed from the main body case 13 and operations of the disconnect switches 52 become possible. Such installation or removal of the protective cover 19 can be performed by only loosening the screws 60 without removing the screws 60 from the screw holes. Therefore, the workability in installing and removing the protective cover 19 can be greatly improved. Further, the installation and removal of the protective cover 19 are performed in the state in which the screws 60 are loosened and shallowly screwed into the screw holes. Therefore, loss of the screws 60 can be prevented.

Further, in the present embodiment, in particular, the contact part is the projection 191 that projects toward the lever 541 from an edge of the protective cover 19. As a result, not only the above-described structure in which the movement direction of the lever 541 and the movement direction of the protective cover 19 match each other, but also a structure in which, for example, the movement direction of the lever 541 and the movement direction of the protective cover 19 are substantially perpendicular to each other, can be realized. Therefore, the degree of freedom in design can be improved.

Further, in the present embodiment, in particular, the projection 191 is provided to project toward a lever of at least one of the switches (54, 56) (the lever 541 of the input side switch 54 in the above example). As a result, by selectively providing a projection with respect to the switches (54, 56), for example, in addition to the above-described structure in which the disconnect switches 52 cannot be operated without turning the input side switch 54 to OFF, a structure in which the disconnect switches 52 cannot be operated without turning the output side switch 56 OFF (see FIG. 9 to be described later), and a structure in which disconnect switches 52 cannot be operated without turning both the switches (54, 56) to OFF (see FIG. 8 to be described later), can also be realized. Therefore, the degree of freedom in design can be greatly improved.

Further, in the present embodiment, in particular, the projection 191 projects toward the lever 541 of the input side switch 54 from the edge 192 corresponding to the upper side of the opening 190 of the protective cover 19. As a result, by such a simple structure in which the projection is formed on the opening 190 of the protective cover 19, the contact part can be realized that comes into contact with the lever 541 of the input side switch 54 so as to restrict the downward movement of the protective cover 19. Therefore, cost can be reduced.

Further, in the present embodiment, in particular, in the substantially rectangular plate-shaped protective cover 19, the long holes (194d, 194e) that are each oriented in the up-down direction are respectively formed in the vicinity of the lower left corner (19a) and the vicinity of the lower right corner (19b), and the cutouts (194a, 194c) are respectively formed in the vicinity of the upper left corner (19c) and the vicinity of the upper right corner (19e). The long holes (194d, 194e) each have the large-diameter part (BP) on one end and the small-diameter part (SP) on the other end, the large-diameter part (BP) having a diameter larger than that of the head part 61 of the screw 60, and the small-diameter part (SP) having a diameter smaller than that of the head part 61. The cutouts (194a, 194c) each have a shape of a long hole having a diameter smaller than that of the head part 61. As a result, at least four corners of the protective cover 19 can be fastened using the screws 60. Therefore, the protective cover 19 can be stably fixed on the main body case 13. Further, the protective cover 19 that can be removed from the main body case 13 by movements in two directions can be realized with such a simple structure in which the long holes (194*d*, 194*e*) and the cutouts (194*a*, 194*c*) are formed in the protective cover 19. Therefore, the cost can be reduced.

5. Modified Embodiments

The present embodiment is not limited to the above-described content. Various modified embodiments are possible within the scope without departing from the spirit and the technical idea of the present embodiment. In the following, such modified embodiments are sequentially described.

5-1. Case where Projections are Provided for Both the Input Side Switch and the Output Side Switch In the above embodiment, the case is described as an example where the projection 191 is provided only for the input side switch 54 among the switches (54, 56). However, it is also possible that projections are provided for both the switches (54, 56).

Figure 8:
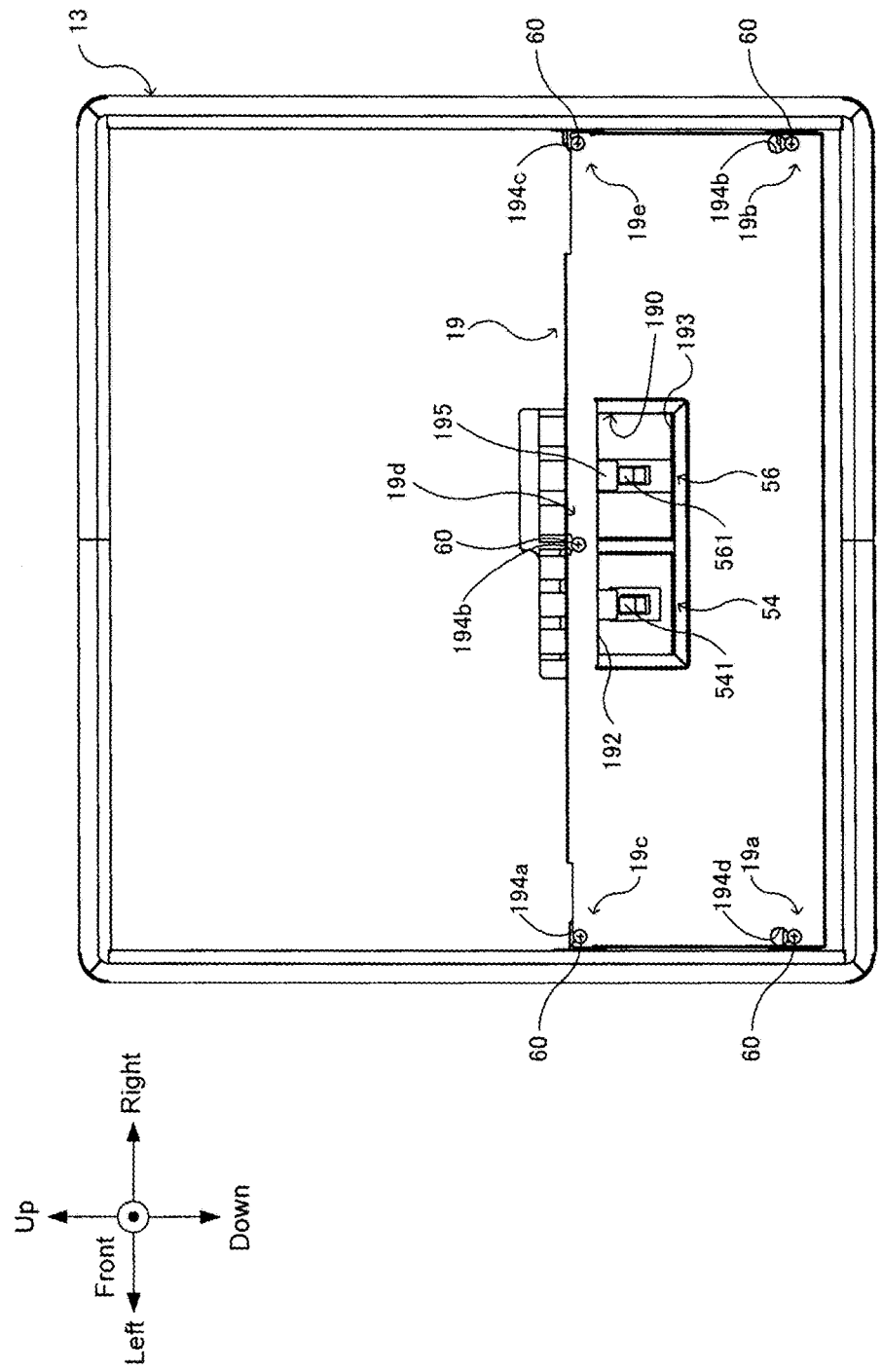
FIG. 8 is a plan view illustrating an example of an internal structure of a main body case in a modified embodiment in which projections are provided for both an input side switch and an output side switch, and corresponds to a state in which levers of both the input side switch and the output side switch are in ON positions and removal of a protective cover from the main body case is restricted.

As illustrated in FIG. 8, in the present modified embodiment, in addition to the above-described projection 191, as an example of a contact part, a projection 195 that projects toward the lever 561 of the output side switch 56 from the edge 192 that corresponds to the upper side of the two upper and lower sides of the above-described opening 190 is provided in the protective cover 19. The projections (191, 195) restrict the removal of the protective cover 19 from the main body case 13 according to the positions of the levers (541, 561) of the switches (54, 56). That is, in the present modified embodiment, the projections (191, 195) correspond to an example of the measure that restricts the removal of the cover from the case 11. Specifically, when the protective cover 19 is removed by moving the protective cover 19 in the above-described two directions, the projection 195 comes into contact with the lever 561 of the output side switch 56 in the above-described ON position so that the downward movement of the protective cover 19 is restricted.

That is, in the present modified embodiment, when at least one of the levers (541, 561) of the switches (54, 56) is in the ON position, at least one of the projections (191, 195) comes into contact with the at least one of the levers (541, 561) and the downward movement of the protective cover 19 is restricted. On the other hand, when both the levers (541, 561) of the switches (54, 56) are in the OFF positions, the downward movement of the protective cover 19 is allowed.

In the present modified embodiment, both the switches 54, 56 correspond to an example of the second switch.

According to the present modified embodiment, the same effects as those of the above embodiment can be obtained. Further, according to the present modified embodiment, the disconnect switches 52 cannot be operated without turning both the switches (54, 56) OFF. Therefore, damage to a component or the like can be more reliably prevented and safety can be further improved.

5-2. Case where a Projection is Provided Only for the Output Side Switch

In the above modified embodiment of (5-1), the case is described as an example where the projections (191, 195) are provided for both the switches (54, 56). However, it is also possible that the projection 195 is provided only for the output side switch 56.

As illustrated in FIG. 9, in the present modified embodiment, as an example of the contact part, the above-described projection 195 is provided in the protective cover 19. That is, in the present modified embodiment, the above-described projection 191 is not provided. The projection 195 restricts the removal of the protective cover 19 from the main body case 13 according to the position of the lever 561 of the output side switch 56. That is, in the present modified embodiment, the projection 195 corresponds to an example of the measure that restricts the removal of the cover from the case 11.

That is, in the present modified embodiment, when the lever 561 of the output side switch 56 is in the ON position, the projection 195 comes into contact with the lever 561 and the downward movement of the protective cover 19 is restricted. On the other hand, when the lever 561 of the output side switch 56 is in the OFF position, the downward movement of the protective cover 19 is allowed.

In the present modified embodiment, the output side switch 56 corresponds to an example of the second switch.

According to the present modified embodiment, the same effects as those of the above embodiment can be obtained. Further, according to the present modified embodiment, a structure is realized in which the disconnect switches 52 cannot be operated without turning the output side switch 56 OFF.

5-3. Case where a Projection Restricts a Movement of the Protective Cover in a Direction Perpendicular to a Movement Direction of a Lever In the above embodiment, the case is described as an example where the projection 191 comes into contact with the lever 541 in the ON position so that the movement of the protective cover 19 in the downward direction, which is a direction along the movement direction of the lever 541 of the input side switch 54. However, it is also possible that a projection comes into contact with the lever 541 in the ON position so that a movement of the protective cover 19 in a direction perpendicular to the movement direction of the lever 541 of the input side switch 54 is restricted.

As illustrated in FIG. 10, in the present modified embodiment, the input side switch 54 has a lever 541' that is a moving part. An ON position of the lever 541' is positioned on a left side and an OFF position is positioned on a right side. The lever 541' is movable in the left-right direction. That is, a movement direction of the lever 541' is the left-right direction. It is also possible that the positional relation between the ON position and the OFF position of the lever 541' is opposite to the one described above.

Further, the output side switch 56 has a lever 561' that is a moving part. An ON position of the lever 561' is positioned on a left side and an OFF position is positioned on a right side. The lever 561' is movable in the left-right direction. That is, a movement direction of the lever 561' is the left-right direction. It is also possible that the positional relation between the ON position and the OFF position of the lever 561' is opposite to the one described above.

The structure of the protective cover 19 remains the same except that, as the contact part, a projection 191' is provided in place of the above-described projection 191. That is, in the present modified embodiment, the downward direction that is the initial movement direction of the protective cover 19 is a direction perpendicular to the movement direction of the levers (541', 561') of switches (54, 56). The projection 191' restricts the removal of the protective cover 19 from the main body case 13 according to the position of the lever 541' of the input side switch 54. That is, in the present modified embodiment, the projection 191' corresponds to an example of the measure that restricts the removal of the cover from the case 11. Specifically, when the protective cover 19 is removed by moving the protective cover 19 in the above-described two directions, the projection 191' comes into contact with the lever 541' of the input side switch 54 in the ON position so that, among the movements of the protective cover 19 in the two directions, the initial downward movement is restricted. That is, the movement direction that is restricted by the projection 191' of the protective cover 19 is the downward direction. It is also possible that, in place of, or in addition to, the projection 191', a projection that comes into contact with the lever 561' of the output side switch 56 in the ON position is provided in the protective cover 19. The projection 191' projects toward the lever 541' from the edge 192 that corresponds to the upper side of the above-described opening 190.

According to the present modified embodiment, the same effects as those of the above embodiment can be obtained.

5-4. Case where a Structure is Adopted in which the Screws Cannot be Removed from the Main Body Case)

In the above embodiment, when the lever 541 of the input side switch 54 is in the ON position, due to the projection 191, the downward movement of the protective cover 19 is restricted. However, when all the screws 60 that fix the protective cover 19 are removed, the protective cover 19 can be removed from the main body case 13. Therefore, despite that the input side switch 54 is ON, the disconnect switches 52 become operable and there is a possibility of causing an erroneous operation of the switches. The present modified embodiment is an example of a case where, in view of the above-described problem, engaging members that respectively engage the threaded parts (62a) of the screws 60 that are removed from the respective screw holes of the main body case 13 are respectively provided in vicinities of the screw holes.

In the following, with reference to FIGS. 11A and 11B, a structure of a vicinity of a screw hole of the main body case 13 in the present modified embodiment is described. Here, a structure of the vicinity of the screw hole that is formed in the support (130a), among the five screw holes of the main body case 13, is described as a representative. However, structures of the vicinities of the screw holes formed in the other supports (130b-130e) are also substantially the same. FIG. 11A corresponds to a state in which the screw 60 is screwed into the screw hole. FIG. 11B corresponds to a state in which the screw 60 is removed from the screw hole.

As illustrated in FIGS. 11A and 11B, in a vicinity of a screw hole (H) that is formed in the support (130a) of the main body case 13, in this example, on the surface of the support (130a), an engaging member 135 is provided. The engaging member 135 has an engaging part (135a). The engaging part (135a) engages the threaded part (62a) of the screw 60 in a state of being removed from the screw hole (H). Thereby, the screw 60 can be prevented from being separated from the main body case 13. The structure of the engaging member 135 is not limited to the structure illustrated in FIGS. 11A and 11B as long as it is a structure capable of engaging the threaded part (62a) of the screw 60 removed from the screw hole (H).

According to the present modified embodiment, even when the screw 60 is removed from the screw hole (H), due to that the engaging member 135 engages the threaded part (62a), the screw 60 can be prevented from being removed from the main body case 13. As a result, the effect of preventing an erroneous operation of a switch can be further enhanced. Further, loss of the screw 60 can be prevented.

Further, in the above description, "vertical," "parallel," "flat surface," or the like does not mean "vertical," "parallel," "flat surface," or the like in a strict sense. That is, "vertical," "parallel" or "flat surface" means "substantially vertical," "substantially parallel" or "substantially flat surface," when tolerances and errors in design and in manufacturing are within allowed ranges.

Further, in the above description, that dimensions and sizes in appearance are "same," "equal," "different," or the like does not mean that the dimensions and sizes in appearance are "same," "equal," "different," or the like in a strict sense. That is, "same," "equal" or "different" means "substantially same," "substantially equal" or "substantially different" when tolerances and errors in design and in manufacturing are within allowed ranges.

Further, in addition to those already described above, techniques according to the above-described embodiment and modified embodiments may be appropriately combined and used.

When an input switch is operated, for a reason of preventing a component from being damaged and for a safety reason, it is desirable that the collector switch be opened in advance. In the above-described conventional technology, measures for preventing an erroneous operation of a switch have not been provided.

A power converter and a power conversion system according to embodiments of the present invention are capable of preventing an erroneous operation of a switch.

According to one aspect of the present invention, a power converter includes: a case; a power converter part that is arranged inside the case, and is structured to convert an input power to a predetermined power and output the predetermined power; one or more first switches that are connected to the power converter part; one or more second switches that are connected to the power converter part and are each provided with a moving part that moves between a first position and a second position; a cover that, when being installed to the case, covers the first switches, and is capable of being removed from the case by being moved in two mutually different directions relative to the case; and a contact part that is provided in the cover and, when the cover is removed by moving the cover in the two directions, comes into contact with the moving part in the first position so that at least a movement of the cover in one direction, among the movements of the cover in the two directions, is restricted.

Further, according to another aspect of the present invention, a power conversion system includes: a power converter; and an external device that provides a power to the power converter. The power converter includes: a case; a power converter part that is arranged inside the case, and is structured to convert an input power to a predetermined power and output the predetermined power; one or more first switches that are connected to the power converter part; one or more second switches that are connected to the power converter part and are each provided with a moving part that moves between a first position and a second position; a cover that, when being installed to the case, covers the first switches, and is capable of being removed from the case by being moved in two mutually different directions relative to the case; and a contact part that is provided in the cover and, when the cover is removed by moving the cover in the two directions, comes into contact with the moving part in the first position so that at least a movement of the cover in one direction, among the movements of the cover in the two directions, is restricted.

Further, according to yet another aspect of the present invention, a power converter includes: a case; a power converter part that is arranged inside the case, and is structured to convert an input power to a predetermined power and output the predetermined power; one or more first switches that are connected to the power converter part; one or more second switches that are connected to the power converter part and are each provided with a moving part that moves between a first position and a second position; a cover that is installed to or removed from the case and, when being installed to the case, covers the first switches; and a measure that restricts removal of the cover from the case according to a position of the moving part of each of the second switches.

A power converter according to an embodiment of the present invention can prevent an erroneous operation of a switch.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter apparatus, comprising:
   a case;
   power converter circuitry positioned in the case and configured to convert an input power to a predetermined power and output the predetermined power;
   a first manual switch positioned in the case and connected to the power converter circuitry;
   a second switch positioned in the case and connected to the power converter circuitry, the second switch having a moving component configured to move between a first position and a second position; and
   a cover installed on the case, wherein
   the installed cover is configured to cover the first manual switch, prevent access to and operation of the first manual switch while the moving component of the second switch is in the first position, and move in two mutually different directions relative to the case during removal of the cover from the case, and
   the cover has a contact portion that is configured to make contact with the moving component of the second switch in the first position and restrict a movement of the cover in at least one of the two mutually different directions when the cover is moved in the at least one of the two mutually different directions.

2. The power converter apparatus according to claim 1, further comprising:
   a holding structure configured to hold the cover onto the case in a fixed state and a semi-fixed state such that the cover is immovably held onto the case in the fixed state and the cover is movably held onto the case in the semi-fixed state,
   wherein the contact portion is configured to make contact with the moving component of the second switch in the first position and restrict the movement of the cover in the at least one of the two mutually different directions when the cover is moved in the at least one of the two mutually different directions in the semi-fixed state.

3. The power converter apparatus according to claim 2, wherein the two mutually different directions include a plate surface direction of the cover, and the contact portion is configured to make contact with the moving component of the second switch in the first position and restrict the movement of the cover in the plate surface direction in the semi-fixed state.

4. The power converter apparatus according to claim 3, wherein the two mutually different directions include a moving direction of the moving component of the second switch, and the contact portion is configured to make contact with the moving component of the second switch in the first position and restrict the movement of the cover in the moving direction of the moving component in the semi-fixed state.

5. The power converter apparatus according to claim 2, wherein the holding structure comprises a screw, the case has a screw hole configured to receive the screw, the cover has a long hole formed to correspond to a position of the screw hole and extending in one of the two mutually different directions to be restricted by the contact portion, and the long hole of the cover has a large-diameter portion in one end and a small-diameter portion in the other end such that the large-diameter portion has a diameter larger than a head part of the screw and the small-diameter portion has a diameter smaller than the head part of the screw.

6. The power converter apparatus according to claim 5, wherein the case has an engaging portion configured to engage with a screw portion of the screw when the screw is disengaged from the screw hole.

7. The power converter apparatus according to claim 1, wherein the contact portion of the cover comprises a projection portion projecting toward the moving component of the second switch from an edge portion of the cover.

8. The power converter apparatus according to claim 7, wherein the second switch is provided in a plurality, and the projection portion of the contact portion is projecting toward the moving component of at least one of the plurality of second switches.

9. The power converter apparatus according to claim 1, wherein the first manual switch comprises a plurality of disconnect switches connected between the power converter circuitry and a plurality of terminals positioned to be connected to an external power supply apparatus, and the second switch comprises at least one of an input-side switch connected to an input side of the power converter circuitry and an output-side switch connected to an output side of the power converter circuitry.

10. The power converter apparatus according to claim 9, wherein the second switch comprises the input-side switch and the output-side switch, the cover has an opening portion having substantially a rectangular shape such that the moving component of each of the input-side and output-side switches is inserted through the opening portion of the cover, and the contact portion of the cover is a projection projecting from a side of the opening portion in a moving direction of the moving component such that the side is corresponding to the first position of the moving component.

11. The power converter apparatus according to claim 1, wherein the case has a plurality of screw holes configured to receive a plurality of screws respectively such that the cover is fixed onto the case, the cover has substantially a rectangular shape and has a plurality of long holes positioned in two corners on one side and a plurality of cutout portions positioned in two corners on the opposite side and each having a long-hole shape, each of the long holes has a large-diameter portion in one end and a small-diameter portion in the other end such that the large-diameter portion has a diameter larger than a head part of the screw and the small-diameter portion has a diameter smaller than the head part of the screw, and each of the cutout portions has a diameter smaller than the head part of the screw.

12. The power converter apparatus according to claim 2, wherein the contact portion of the cover comprises a projection portion projecting toward the moving component of the second switch from an edge portion of the cover.

13. The power converter apparatus according to claim 2, wherein the first manual switch comprises a plurality of disconnect switches connected between the power converter circuitry and a plurality of terminals positioned to be connected to an external power supply apparatus, and the second switch comprises at least one of an input-side switch connected to an input side of the power converter circuitry and an output-side switch connected to an output side of the power converter circuitry.

14. The power converter apparatus according to claim 13, wherein the second switch comprises the input-side switch and the output-side switch, the cover has an opening portion having substantially a rectangular shape such that the moving component of each of the input-side and output-side switches is inserted through the opening portion of the cover, and the contact portion of the cover is a projection projecting from a side of the opening portion in a moving direction of the moving component such that the side is corresponding to the first position of the moving component.

15. The power converter apparatus according to claim 2, wherein the case has a plurality of screw holes configured to receive a plurality of screws respectively such that the cover is fixed onto the case, the cover has substantially a rectangular shape and has a plurality of long holes positioned in two corners on one side and a plurality of cutout portions positioned in two corners on the opposite side and each having a long-hole shape, each of the long holes has a large-diameter portion in one end and a small-diameter portion in the other end such that the large-diameter portion has a diameter larger than a head part of the screw and the small-diameter portion has a diameter smaller than the head part of the screw, and each of the cutout portions has a diameter smaller than the head part of the screw.

16. A power converter apparatus, comprising:
a case;
power converter circuitry positioned in the case and configured to convert an input power to a predetermined power and output the predetermined power;
a first manual switch positioned in the case and connected to the power converter circuitry;
a second switch positioned in the case and connected to the power converter circuitry, the second switch having a moving component configured to move between a first position and a second position; and
a cover installed on the case, wherein
the installed cover is configured to cover the first manual switch, prevent access to and operation of the first manual switch while the moving component of the second switch is in the first position, and move in two mutually different directions relative to the case during removal of the cover from the case, and
the cover has means for restricting a movement of the cover in at least one of the two mutually different directions when the cover is moved in the at least one of the two mutually different directions.

17. A power conversion system, comprising:
an external power supply device; and
a power converter apparatus connected to the external power supply device and comprising a case, a power converter circuitry positioned in the case and configured to convert an input power to a predetermined power and output the predetermined power, a first manual switch positioned in the case and connected to the power converter circuitry, a second switch positioned in the case and connected to the power converter circuitry, the second switch having a moving component configured to move between a first position and a second position, and a cover installed on the case, wherein
the installed cover is configured to cover the first manual switch, prevent access to and operation of the first manual switch while the moving component of the second switch is in the first position, and move in two mutually different directions relative to the case during removal of the cover from the case, and
the cover has a contact portion that is configured to make contact with the moving component of the second switch in the first position and restrict a movement of the cover in at least one of the two mutually different directions when the cover is moved in the at least one of the two mutually different directions.

18. The power conversion system according to claim 17, wherein the power converter apparatus further comprises a holding structure configured to hold the cover onto the case in a fixed state and a semi-fixed state such that the cover is immovably held onto the case in the fixed state and the cover is movably held onto the case in the semi-fixed state, and the contact portion is configured to make contact with the moving component of the second switch in the first position and restrict the movement of the cover in the at least one of the two mutually different directions when the cover is moved in the at least one of the two mutually different directions in the semi-fixed state.

19. The power conversion system according to claim 18, wherein the two mutually different directions include a plate surface direction of the cover, and the contact portion is configured to make contact with the moving component of the second switch in the first position and restrict the movement of the cover in the plate surface direction in the semi-fixed state.

20. The power conversion system according to claim 19, wherein the two mutually different directions include a moving direction of the moving component of the second switch, and the contact portion is configured to make contact with the moving component of the second switch in the first position and restrict the movement of the cover in the moving direction of the moving component in the semi-fixed state.

* * * * *